United States Patent
Poppe et al.

[15] 3,655,433
[45] Apr. 11, 1972

[54] PLATABLE POLYMERS

[72] Inventors: Wassily Poppe; Habet M. Khelghatian, both of Springfield, Pa.; James E. Fitzpatrick, Naperville, Ill.

[73] Assignee: Standard Oil Company, Chicago, Ill.

[22] Filed: July 6, 1970

[21] Appl. No.: 52,784

Related U.S. Application Data

[63] Continuation-in-part of Ser. No. 732,545, May 28, 1968.

[52] U.S. Cl. ..................117/138.8 E, 260/27, 117/47 A, 117/160 R, 204/30
[51] Int. Cl. ..................................................B32b 27/32
[58] Field of Search..............204/30, 38 B; 117/138.8 E, 117/160 R; 161/216; 260/27 R

[56] References Cited

UNITED STATES PATENTS

| | | | |
|---|---|---|---|
| 3,466,232 | 9/1969 | Francis et al. | 204/30 |
| 2,837,491 | 6/1958 | McKay | 260/27 |
| 3,462,288 | 8/1969 | Schmidt et al. | 117/138.8 E |
| 2,689,805 | 9/1954 | Croze et al. | 117/160 |
| 3,201,271 | 8/1965 | Simmons et al. | 204/30 |
| 3,513,015 | 5/1970 | Fitzpatrick et al. | 204/30 |
| 3,532,518 | 10/1970 | D'Ottavio | 204/30 |

OTHER PUBLICATIONS

Narcus, Vacuum Metallizing, Metallizing of Plastics, Reinhold Publishing Corp., N.Y. Oct. 1960

*Primary Examiner*—William D. Martin
*Assistant Examiner*—Sadie L. Childs
*Attorney*—Roger V. N. Powelson and Arthur G. Gilkes

[57] ABSTRACT

In the art of electroplating nonconductive materials, adhesion of metal to the material is enhanced by incorporating into the material from 1 to 25 percent by weight of a metal resinate. Crystalline polyolefins, such as polyethylene, polypropylene and propylene-ethylene copolymer, are modified with calcium resinate, zinc resinate, aluminum resinate, sodium resinate, potassium resinate or ammonium resinate to improve the adhesion of metal thereto.

4 Claims, No Drawings

PLATABLE POLYMERS

This application is a continuation-in-part of U.S. Ser. No. 732,545, filed May 28, 1968.

The present invention relates to polyolefin compositions and more particularly to polyolefin compositions which are suitable for electroplating. In another embodiment, the present invention relates to the modification of polyolefins to make surfaces of articles prepared from such polyolefin compositions improved in their utility and electroplating.

The problem of causing ink, paint or other types of coating to adhere to a polyolefin surface is well-known. Various methods and means have been suggested for improving the adhesion to surfaces. In general, the approach to solving the problem of adhesion to a polyolefin surface has been to modify the surface of the finished article by an oxidizing treatment of some kind. Although some of the methods based on surface oxidation of a polypropylene have been proven to be satisfactory for imparting printability to a polyolefin surface such treatment, in general, has found only limited success in causing a superior bond between the surface of the polyolefin article and metal plated onto the surface. The electroplating of a polyolefin article in which the metal plate, having thicknesses in the range of 1 mil, is tightly bonded to the polyolefin substrate constitutes, however, a highly desirable goal in view of the more recently developed polyolefins which can be considered engineering plastics and thus substitutes for zinc die casts or other metals. An electroplated metal coating having good adhesion to the plastic substrate, furthermore, improves the structural properties of the plastic thereby enhancing its use as a substitute for metals. The advantages of using polyolefins in such applications include lower cost of materials, cheaper tooling and tool maintenance, lower finishing costs in buffing and polishing and lower shipping costs. The use of polyolefins, furthermore, allows greater versatility of product design and gives a more corrosion-resistant end product. In the engineering and aerospace fields, the substitution of plastics for metal can result in weight savings which is always of vital importance. Increased adhesion between the metal plate and the polyolefin substrate causes improved physical properties such as flexural modulus, impact strength and temperature deflection.

It is known to incorporate additives into polyolefins such as polypropylene in order to improve etching of the surface by oxidizing acids to a point at which a satisfactory metal-to-plastic bond is obtained in subsequent plating operations. Such compositions are, for example, shown in U.S. Pat. application Ser. No. 637,316, filed May 3, 1967, by Khelghatian and Poppe, two of the inventors herein, and now abandoned. This application discloses platable polyolefin compositions containing small amounts of a surfactant together with a compatible sulfur compound, and shows that with such compositions metal-to-plastic bonds of 13–16 lbs./in. may be obtained. In order to obtain such bonds it is necessary to treat the shaped polyolefin with an oxidizing acid containing chromium trioxide under severe conditions, for example, 10 minutes at 85° C. At lower temperatures more time is required to properly condition the surface. Under these conditions severe etching takes place, and the chromium trioxide rapidly becomes depleted.

It is an object of this invention to provide polyolefin compositions which can be conditioned for electroplating by treatment with an oxidizing acid for much shorter times than the previously known compositions, with attendant lowering of consumption of oxidizing agent.

It is a further object of the invention to provide polyolefin compositions which, when conditioned with an oxidizing acid at conventional temperatures and times, will have a metal-to-plastic bond strength far higher than can be obtained with previously known polyolefin compositions.

The polyolefin compositions of the present invention comprise polyolefins containing from 1 to 25 percent by weight and preferably from 2 to 10 percent by weight of a metal resinate such as calcium resinate, zinc resinate, aluminum resinate, sodium resinate, potassium resinate, or ammonium resinate. If more than 25 percent of the resinate is blended into the polyolefin, adhesion of metal to the substrate is improved but the substrate loses tensile strength and becomes brittle to such an extent that it is of no commercial interest. The polyolefin may contain, and preferably does contain, a small amount of a surfactant and an organic sulfur compound in addition to the resinate, but the resinate alone gives adequate metal-to-plastic bond strength.

The polyolefins modified by the addition of the metal resinate comprise in general all polymers obtained by the addition polymerization of a hydrocarbon containing terminal ethylenic unsaturation. Although vinyl aromatic polymers can be improved for electroplating by using the above-described additives, the polyolefins preferably employed are crystalline polymers of aliphatic olefins such as polyethylene, crystalline polypropylene, crystalline ethylene-propylene copolymers, ethylene butene-1 copolymers, polybutene-1, poly (4-methylpentene-1), poly (3-methylbutene-1), and the like. The term polyolefin as used herein is, furthermore, intended to include copolymers of hydrocarbon monomers with copolymerizable polar monomers in which such functional monomers constitute up to 10 percent of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. The modified polyolefin compositions of the present invention, furthermore, can contain inert inorganic fillers such as asbestos fibers, glass fibers, carbon, silica, talc and alkaline earth salts which are frequently added to improve the rigidity of the polyolefin. In addition, the polyolefin compositions of the present invention can contain other additives normally added to the polyolefin in order to improve fabricability or solid state properties of such polyolefin.

The compositions of the present invention are formed by methods heretofore employed for the addition of modifiers to a polyolefin. Such methods generally involve melt blending of the polymer and the additive in equipment such as extruders, stirred mixers or milling rolls. However, other methods of distributing additives in the polyolefin are not intended to be excluded. In blending the additives with the polyolefin, the same precautions against degradation of a polymer and additive heretofore practiced should also be observed in the formulation of the compositions of the present invention.

The modified polyolefins of the present invention are shaped into the article desired to be electroplated by any of the means heretofore employed for the preparation of such articles inclusive of which are compression molding and injection molding.

Although a variety of processes have been developed for the electroplating of nonconductive surfaces and in particular plastics, the same general steps are usually employed. Thus, the plating of articles made from the modified polyolefins of the present invention is generally conducted using the following steps:

1. The surface to be plated is cleaned using a mild alkaline bath to remove oils, mold release agents, and fingerprints.

2. The alkaline material retained by the surface is neutralized using a mild acid.

3. The clean surface is then chemically etched with a conditioner containing concentrated mineral acid such as sulfuric acid and chromic trioxide or a chromate.

4. The resulting etched surface is sensitized with a readily oxidizable tin salt solution such as stannous chloride which causes tin to be absorbed on the surface.

5. The surface is then activated or nucleated by treatment with an aqueous solution of a noble metal salt such as palladium chloride which forms a metallic film at discrete activated sites.

6. The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.

7. The electrodeposition of metal is then followed by conventionally plating of the surface with copper, nickel and/or chromium or just nickel and chromium. The thickness of the electroplated coating is generally within the range of 0.1 to 1.5 mil.

It is, furthermore, highly desirable if not essential to rinse and clean the surface being treated with water between each of the steps outlined and in some instances, it may also be desirable to dry the surface between the various treating steps. Since the various outlined steps employed in the electroplating of nonconducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating of plastic and particularly polyolefin surfaces.

The polyolefin compositions of the present invention are as indicated particularly suitable in the electroplating of articles made from the composition in that they give rise to a greatly improved bond strength between the metal plate and the polyolefin substrate. Although the adhesion of metal plate to the substrate can be measured by various tests, bond strength is preferably measured by the pull test in which two parallel cuts are made into the plated metal coating, one half-inch apart, an additional vertical cut is made to form a tab, one end of the resulting tab then being raised sufficiently to allow gripping by a tensile testing machine; the specimen is then placed into a tensile rig and the tab is pulled vertically from the surface. The force required to pull the tab is measured as the bond strength. For most applications, a bond strength of 6 to 10 lbs./in. is adequate, but if the plated article in use is to be subjected to mechanical shock or extremes of temperature, bond strengths in excess of 25 lbs./in. are desirable.

The present invention is further illustrated by the following examples and controls in which all parts and percentages are by weight unless otherwise indicated.

CONTROL 1

To 100 parts of crystalline polypropylene having a flow rate of 3.4 (ASTM D–1238–62T) is added 0.5 part of "Triton" X–100, a commercially available nonionic detergent of iso-octylphenyl polyethoxyethanol, 0.5 percent of dilauryl thiodipropionate, and 5 percent $TiO_2$. The polymer was melt blended in an extruder causing the additives to be uniformly distributed throughout the polypropylene. The modified polypropylene was then molded into 3 inch × 2 inch × 110 mil plaques which are electroplated by the following process.

The plaques were immersed consecutively in a conditioner consisting of 40 percent sulfuric acid (96 percent concentration), 39.5 percent phosphoric acid (85 percent concentration), 3 percent chromium trioxide and 17.5 percent of water to which has been added, per liter of conditioner, 36 g. of an additive containing 64 percent of chromium trioxide and 36 percent of sodium hydrogen sulfate, for a period of 5 minutes at 77° C.; in a stannous chloride sensitizer solution containing per liter of solution 10 g. of $SnCl_2$ and 40 ml. of HCl at ambient temperatures of 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle Salt, 40 g. of sodium hydroxide and 166 g. of formaldehyde (37 percent solution) at a temperature of 70° C. for a period sufficient to obtain a continuous coating capable of conducting electricity. Between each of the immersions described, the plaque is thoroughly rinsed with distilled water. The resulting plaque, on washing with water, was then electroplated with copper for about 20 minutes, at a current density of approximately 30 amps/sq. ft., resulting in a 1 mil coating of copper on the plaque. The plated plaque was not acceptable due to blistering.

CONTROL 2

Control 1 was repeated, except that the treatment with the acid solution was for 10 minutes instead of 5. Again the plated plaque was unacceptable because of blistering.

CONTROL 3

Control 1 was repeated, increasing the time of treatment with the acid solution to 15 minutes. This time the plated plaque was acceptable, and a bond strength of about 36 lbs./in. was obtained.

EXAMPLE 1

Control 1 was repeated, except that the polypropylene contained 3.5 percent of calcium resinate containing about 4.5 percent ash as CaO. The plated plaque was acceptable, and the bond strength was about 25 lbs./in.

EXAMPLE 2

Example 1 was repeated, except that a crystalline ethylene-propylene terminal block copolymer was substituted for the polypropylene of Example 1. A bond strength of about 19 lbs./in. was obtained.

EXAMPLE 3

Example 1 was repeated, except that the polymer was polyethylene containing 10 percent calcium resinate and the conditioner consisted of 55 percent sulfuric acid, 10 percent potassium dichromate, and 35 percent water. A bond strength of about 9 lbs./in. was obtained.

EXAMPLE 4

Example 1 was repeated, except that the conditioner was the conditioner of Example 3, and the polymer contained 5 percent calcium resinate and the conditioning temperature was 60° C. A bond strength of about 14 lbs./in. was obtained.

EXAMPLE 5

The procedure of Example 4 was repeated, except that the conditioning temperature was increased to 70° C. A bond strength of about 24 lbs./in. was obtained.

EXAMPLE 6

The procedure of Example 4 was repeated, except that the conditioning temperature was 80° C. A bond strength of about 34 lbs./in. was obtained.

EXAMPLE 7

The procedure of Example 4 was repeated, except that the conditioning temperature was 60° C. and the time of conditioning with the acid solution was 2 minutes. A bond strength of about 9 lbs./in. was obtained.

EXAMPLE 8

The procedure of Example 7 was repeated, except that the conditioning temperature was increased to 70° C. A bond strength of about 17 lbs./in. was obtained.

EXAMPLE 9

Repeating Example 4 at 60° C. and a conditioning time of 1 minute, a bond strength of 6 lbs./in. was obtained.

EXAMPLE 10

The procedure of Example 9 was followed, except that the conditioning temperature was 70° C. A bond strength of 10 lbs./in. was obtained.

EXAMPLE 11

Example 9 was repeated, except that the conditioning temperature was 80° C. A bond strength of about 15 lbs./in. was obtained.

EXAMPLE 12

The procedure of Example 9 was followed, except that the conditioning time was 30 seconds, and the temperature was 90° C. A bond strength of 10 lbs./in. was obtained.

EXAMPLE 13

If extremely high bond strengths are required, these may be obtained by increasing the conditioning time and temperature. If Example 4 is repeated, with a conditioning time of 15 minutes, at 90° C. a bond strength of 42 lbs./in. is obtained, and at 100° C. the bond strength is 44 lbs./in.

EXAMPLE 14

In this example, the polypropylene used as the base material contained 0.5 part of "Triton" X–100, 0.5 percent dilauryl thiodipropionate, 5 percent TiO$_2$, and 3.5 percent of zinc resinate containing 5.6 percent combined zinc and 1.8 percent combined calcium. A plaque molded from this material was conditioned at 80° C. for 5 minutes with the conditioner of Example 3, followed by the plating steps outlined in Control 1. A bond strength of 27 lbs./in. was obtained. Substituting zinc resinates containing 4.9 percent zinc and 1.7 percent calcium; 8.9 percent zinc and 0.6 percent calcium; and 2.3 percent zinc and 2.6 percent calcium, similar bond strengths were obtained. 3.5 percent of aluminum resinate substituted for the zinc resinate gave a bond strength of 25 lbs./in.

EXAMPLE 15

Incorporation of the metal resinates also appears to shorten the time required in the electroless plating steps. A plaque containing 5 percent calcium resinate was successively treated with the conditioner of Example 3 at 90° C. for 30 seconds, with the sensitizer of Control 1 for 30 seconds, with the activator solution for 30 seconds, and with the electroless copper plating solution for 5 minutes, a total cycle time of only 6.5 minutes. When subsequently electroplated, a bond strength of about 9 lbs./in. was realized.

As previously stated, it is preferred that the polymer to be plated contain the surfactant and the organic sulfur compounds, but these are not necessary, and adequate, but slightly lower bond strengths, are obtained in their absence. The TiO$_2$ added to the polymer in the examples does not affect the bond strength, but does improve the surface quality of the molded article.

EXAMPLE 16

Five percent calcium resinate was blended with polypropylene without adding any "Triton," dilauryl thiodipropionate, or TiO$_2$. Plaques formed from this material were conditioned at 80° C. for 5 minutes with the conditioner of Example 3, followed by the plating steps. Bond strengths of 18–20 lbs./in. were obtained. Repeating this example, but with the addition of 0.5 percent dilauryl thiodipropionate, bond strengths of 22–24 lbs./in. were obtained.

What is claimed is:

1. As an article of manufacture, a substrate comprising a crystalline polyolefin intimately mixed with from 1 to 25 percent of the polyolefin of a metal resinate, and a metal coating adherent to the substrate.

2. The article of claim 1 in which the content of metal resinate is from 2 to 10 percent by weight.

3. The article of claim 1 in which the polyolefin is a crystalline polypropylene.

4. The article of claim 1 in which the polyolefin is a crystalline propylene-ethylene copolymer.

* * * * *